United States Patent [19]
Hsu et al.

[11] Patent Number: 5,742,710
[45] Date of Patent: Apr. 21, 1998

[54] COMPUTATIONALLY-EFFICIENT METHOD FOR ESTIMATING IMAGE MOTION

[75] Inventors: Stephen Charles Hsu, Cranbury; Padmanabhan Anandan, Robbinsville, both of N.J.

[73] Assignee: RCA Thomson Licensing Corporation, Princeton, N.J.

[21] Appl. No.: 500,558

[22] Filed: Jul. 11, 1995

Related U.S. Application Data

[63] Continuation of Ser. No. 200,599, Feb. 23, 1994, abandoned.

[51] Int. Cl.$^6$ .................................................. G06K 9/36
[52] U.S. Cl. .................................................. 382/236
[58] Field of Search ............................ 382/236, 232, 382/253; 348/402, 407, 408, 409, 412, 413, 415, 416, 430, 431

[56] References Cited

U.S. PATENT DOCUMENTS

| | | | |
|---|---|---|---|
| 4,674,125 | 6/1987 | Carlson et al. | 382/49 |
| 4,703,514 | 10/1987 | van der Wal | 382/41 |
| 4,853,779 | 8/1989 | Hammer et al. | 358/133 |
| 4,864,394 | 9/1989 | Gillard | 358/105 |
| 4,937,666 | 6/1990 | Yang | 348/413 |
| 4,965,666 | 10/1990 | Haghiri | 358/105 |
| 4,980,764 | 12/1990 | Henot | 358/133 |
| 5,105,271 | 4/1992 | Niihara | 348/409 |
| 5,173,771 | 12/1992 | Kitazato | 348/416 |
| 5,276,513 | 1/1994 | van der Wal et al. | 358/136 |
| 5,278,915 | 1/1994 | Chupeau et al. | 348/413 |
| 5,311,310 | 5/1994 | Jozawa et al. | 348/416 |
| 5,351,095 | 9/1994 | Kerdranvat | 348/407 |

OTHER PUBLICATIONS

C.Bergeron, E.Dubois, "Gradient Based Algorithms For Block Oriented MAP Estimation of Motion and Application to Motion–Compensated Temporal Interpolation", IEEE Trans. On Circuits and Systems for Video Technology, vol. 1, No. 1, Mar. 1991, pp. 72–85.

K. Metin Uz et al., "Interpolative Multiresolution Coding of Advanced Television with Compatible Subchannels", IEEE Trans. on Circuits and Systems for Video Technology, vol. 1, No. 1, Mar. 1991, pp. 86–98.

P. Anandan, "A Computational Framework and an Algorithm for the Measurement of Visual Motion", Int. Journal of Computer Vision 2, pp. 283–310, 1989, Kluwer Pub.

M. Bierling, "Displacement Estimation by Hierarchical Blockmatching", 3rd SPIE Symposium on Visual Comm. & Image Processing, Nov. 1988,Cambridge, MA.

Anandan, P. "Measuring Visual Motion From Image Sequences", Coins Technical Report 87–21, Mar. 1987, pp. 41–88,Univ. of Mass. at Amherst.

*Digital Image Processing and Computer Vision*, pp. 339–344.

Paper presented at a HDTV Seminar held on 8 May 1991.

*Fundamentals of Digital Image Processing*, pp. 525–526.

*Primary Examiner*—Jose L. Couso
*Attorney, Agent, or Firm*—Joseph S. Tripoli; Eric P. Herrmann; Ronald H. Kurdyla

[57] ABSTRACT

A block-matching method for generating motion vectors performs block matching on successively higher resolution images by refining motion vectors determined in a lower resolution image. At respective higher resolution images, search areas of limited search range are defined via a motion vector associated with corresponding image areas in the immediately lower resolution search. For at least one level of image resolution, the search blocks are overlapped to provide a plurality of search areas of limited search range for performing block matching searches for each block in the next higher resolution level.

18 Claims, 7 Drawing Sheets

FIG. 1
PRIOR ART

16X16 PIXEL
FULL-RESOLUTION
BLOCK 200 OF
CURRENT FRAME

FIG. 2a m X n PIXEL
FULL-RESOLUTION
CURRENT IMAGE 202
(PYRAMID LEVEL 0)

FIG. 2b

8X8 PIXEL
1/2 RESOLUTION
BLOCK 204

FIG. 2c m/2 X n/2 PIXEL
1/2 RESOLUTION
CURRENT IMAGE 206
(PYRAMID LEVEL 1)

COMPUTATIONALLY-EFFICIENT METHOD FOR ESTIMATING IMAGE MOTION

This is a continuation of application Ser. No. 08/200,599, filed Feb. 23, 1994 now abandoned.

BACKGROUND OF THE INVENTION

Video-signal digital processors employing motion estimators are known in the art. Such processors are used to provide estimates of motion depicted in a time-varying image defined by a sequence of digitized image frames. Such motion estimates are useful for applications such as motion-compensated coding, frame rate conversion, scan conversion, noise reduction, and three-dimensional time-varying scene analysis and object tracking in computer vision.

One known approach to motion estimation employs a 2-dimensional block matching process in which a block-by-block search is made at full pixel resolution between a current image frame and a previous image frame. For each target block of the current image, the problem is to compute a translational displacement to the best matching block area in the prediction image. For a search range sufficient to cover typical motions in TV, the conventional approach of exhaustive search is expensive or impractical to realize. Furthermore, the motion vectors obtained from exhaustive search may not accurately reflect physical motion of objects in the scene and, therefore, do not promote optimum image compression or error concealment.

Other known approaches to motion estimation employ a hierarchical strategy in which the full-resolution image is decomposed by pyramid techniques into a plurality of successively lower-resolution images, which are then used to provide a coarse-to-fine estimation of image motion. One example of this hierarchical strategy, which is implemented in hardware and permits motion estimation to be performed in real time, is disclosed in U.S. Pat. No. 5,276,513, by van der Waal, which issued Jan. 4, 1994 and is assigned to the same assignee as the present application. In the van der Waal patent, motion vectors are initially coarsely estimated for a pyramid-derived, reduced resolution image comprising pixels of a size that are larger than the maximum image displacement between successive image frames, then these coarsely-estimated motion vectors are successively refined on images of increasing resolution, finally producing motion vectors for the full-resolution image. The maximum image displacement between successive image frames at each pyramid level is ±1 pixel at that level. In another example of this hierarchical strategy, which is implemented in software and employs an overlapped pyramid coarse-to-fine projection scheme, is disclosed in the article "A Computational Framework and an Algorithm for the Measurement of Visual Motion", appearing in the International Journal of Computer Vision 2, 283–310 (1989) to provide a more accurate estimation of image motion. While this hierarchical strategy of motion estimation is significantly more computationally efficient than non-hierarchical motion analysis performed only on the full resolution image, the total number of computations required by van der Waal and by the aforesaid article for a sequence of high-definition images remains expensive.

As known, digital television systems (including both high definition and standard definition), as currently envisioned, require video compression prior to transmission of digitized video signals over limited bandwidth video channels. Therefore, there is a need for a video compression encoder that is capable of computing motion vectors in a sufficiently accurate and efficient manner to be cost-effective and practical.

SUMMARY OF THE INVENTION

The present invention is directed to a block-matching image motion estimation method exhibiting reduced computational complexity.

More specifically, this block-matching image motion estimation method is responsive to a full-resolution 2-dimensional digitized image of a current image frame, a full-resolution 2-dimensional digitized previous image frame, N levels of pyramid-derived successively lower-resolution images of the current image frame, and N levels of pyramid-derived successively lower-resolution images of the previous image frame, where N has a value of at least 2 and each of the full-resolution current and previous image frames constitutes a zero (0) pyramid level.

The method comprises the steps of (a) dividing the Nth pyramid level of the current image frame into a plurality of search blocks of a first size which are overlapped in at least one of the 2 dimensions, and (b) employing each of the overlapped search blocks for use in making a match search of the Nth pyramid level of the previous image frame over a given range area to determine the motion vector to that block of the Nth pyramid level of the previous image frame which exhibits the lowest match value with respect to that search block. A set of associated Nth pyramid level blocks is defined by projections of respective (N−1)th pyramid level blocks onto the Nth level. A plurality (equal in number to the number of associated blocks) of block matching searches is performed for each (N−1)th level block, wherein motion vectors of respective associated Nth level blocks are utilized to define a limited (N−1)th level search area for each search of the respective plurality of searches. For each plurality of searches the block matching search resulting in the lowest error value is selected for the corresponding (N−1)th level block.

DESCRIPTION OF PREFERRED EMBODIMENT

Figure 1:
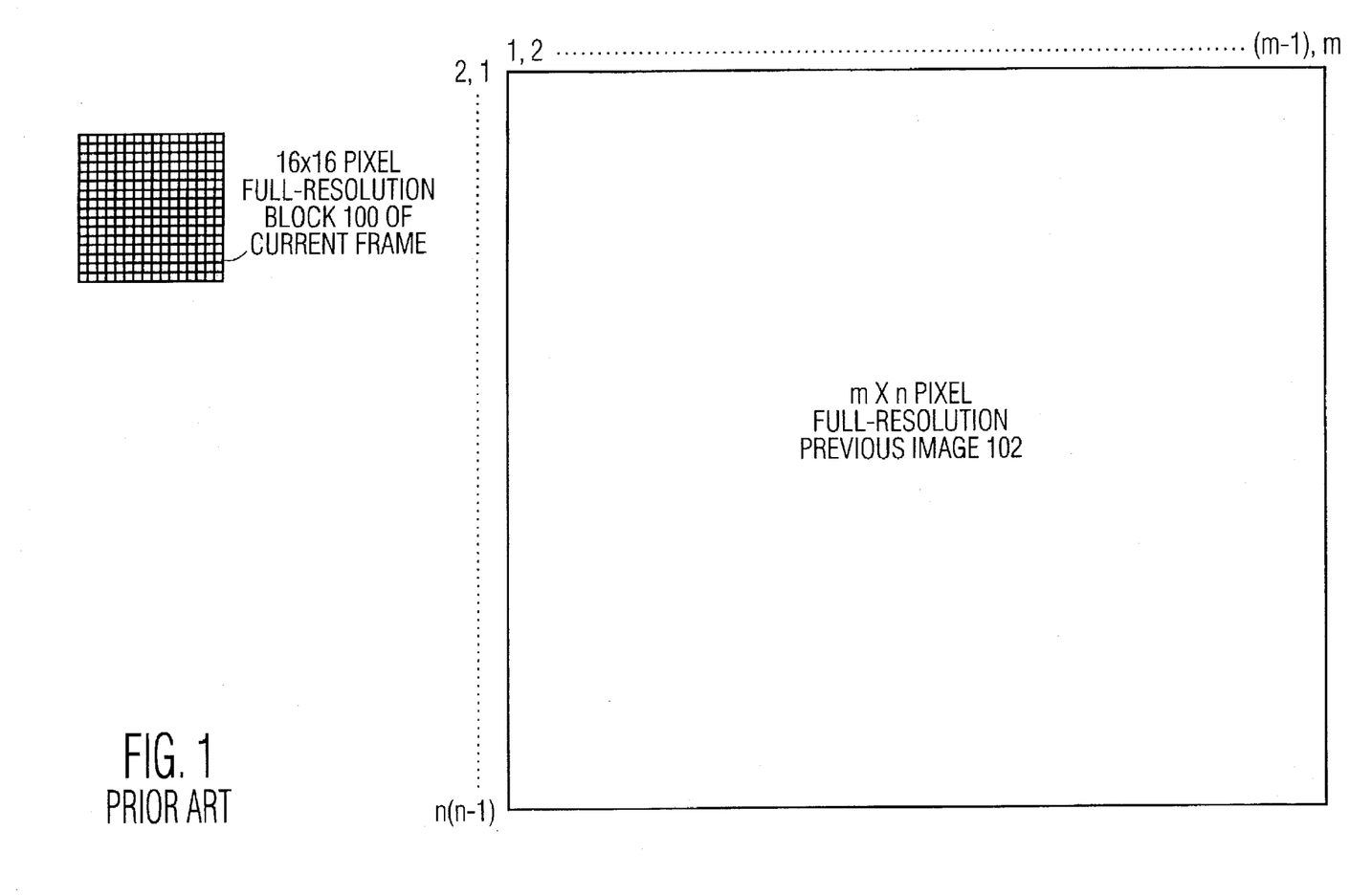
FIG. 1 diagrammatically illustrates an example of a conventional block motion estimation method known in the art employing a 2-dimensional block matching process in which a block-by-block search is made at full pixel resolution between a current digitized image frame and a previous image frame computed from the preceding digitized image frame.

Referring to FIG. 1, there is shown 16×16 pixel full-resolution block 100 and m×n pixel full-resolution image 102. Block 100 may be a block of 16×16 pixels having certain x,y coordinates selected from a plurality of such contiguous blocks into which the current m×n pixel full-resolution image frame of a source image is divided, and image 102 is the preceding m×n pixel full-resolution image frame. Image motion that takes place between the previous image frame and current image frame may result in image displacements in each of the horizontal and vertical directions between zero pixels (i.e., stationary image in that dimension) and a given maximum number of pixels (i.e., the maximum movement that can be expected in that dimension within a single frame period). In the prior-art method exemplified in FIG. 1, successive matches are made, in turn, between 16×16 blocks of m×n pixel image 102 and selected block 100 of 16×16 pixels over a range of $\pm R_x$ (e.g., $\pm 128$) pixels in the horizontal direction and $\pm R_y$ (e.g., $\pm 128$) pixels in the vertical direction about that block of m×n pixel image 102 which corresponds in pixel coordinates to those of selected block 100. Thus, the size of the search area is R (e.g., $\pm 128 \times \pm 128 = 65,536$) pixels.

The match position of selected block 100 is displaced a single pixel between successive matches. The matching process consists of computing the absolute value of the differences (or a positive function of the differences) between the digital values of the 256 respective pairs of corresponding pixels of a block of m×n pixel image 102 and the selected block 100, and then summing the 256 differences to derive a match value for that match (so that a derived match value of zero would be indicative of a perfect match). This matching process is repeated for each pixel match position in the search area R (i.e., 65,536 times) to determine which particular 16×16 block of m×n pixel image 102 has the minimum match value.

The displacement (i.e., motion vector) between the x,y pixel coordinates of the block of m×n pixel image 102 which has been computed to have the minimum match value with respect to the x,y pixel coordinates of selected block 100 itself provides an accurate estimate of the amount of image motion that occurred between the previous image frame and the current image frame. However, this accurate estimate of image motion is achieved in the conventional block motion estimation method of FIG. 1 at the cost of a relatively high computational complexity (where "computational complexity", as used herein, is quantitatively defined as the total number of "computational operations" required to search all blocks divided by the number of pixels N in the whole full resolution image. One "computational operation" is defined as a comparison between two pixels at the resolution of any pyramid level whatsoever and addition of the residual to an accumulator. For an assumed range area of R, the complexity of exhaustive search equals R because each full-resolution pixel of the current image gets compared to R different full-resolution pixels of the the previous image.

The matching process may be further refined by generating interpolated pixel values interstitial real pixel values in the image area defined by the best block match. A further block matching search is then performed over a $\pm \frac{1}{2}$ pixel range to provide motion vectors with half pixel resolution accuracy.

The difference between the x, y coordinates of the block of the previous frame having the lowest match value and the x, y coordinates of selected block 100 of the current frame determines the motion vector associated with the block of the previous frame having the lowest match value.

The motion-estimation method of the present invention, as exemplified by FIGS. 2a to 2h, 3 and 4 is capable of reducing the computational complexity of the prior-art motion-estimation method exemplified by FIG. 1 by a factor of about 720, thereby making image motion-estimation practical and cost effective.

More specifically, the present invention employs known pyramid techniques to decompose the current image frame of a full-resolution source image and a full-resolution previous image frame into a plurality of successively lower-resolution image frames. While different pyramid types such as bandpass, lowpass, and energy may be used, it is assumed, for illustrative purposes, that a four-level Gaussian pyramid (i.e., levels 0, 1, 2 and 3) with filter kernel coefficients 1,4,6,4,1 is used, since such a Gaussian pyramid provides an efficient implementation of the invention.

Figure 2A:
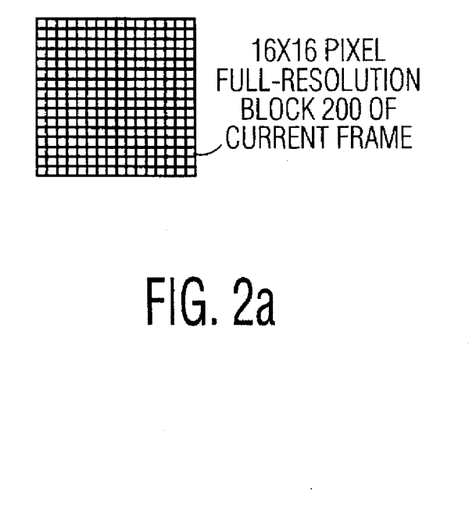
FIGS. 2a to 2h together diagrammatically illustrate a pyramid decomposition of both the full-resolution search blocks and full-resolution current-image frames of FIG. 1 into ½, ¼ and ⅛th resolution blocks and current-image frames employed in the implementation of a preferred embodiment of the motion-estimation method of the present invention.
Figure 2B:
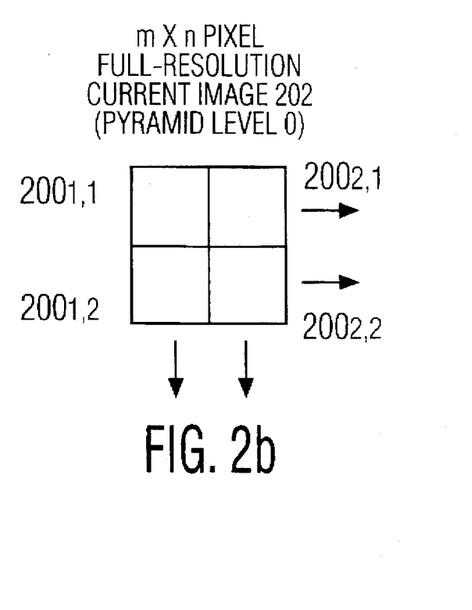
Figure 2C:
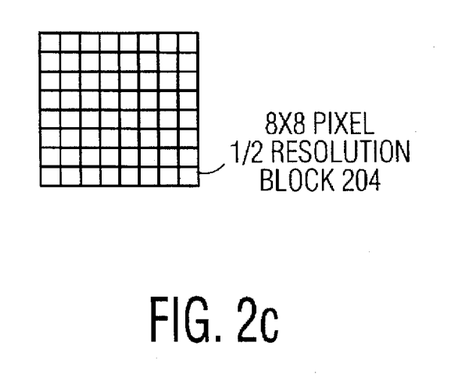
Figure 2D:
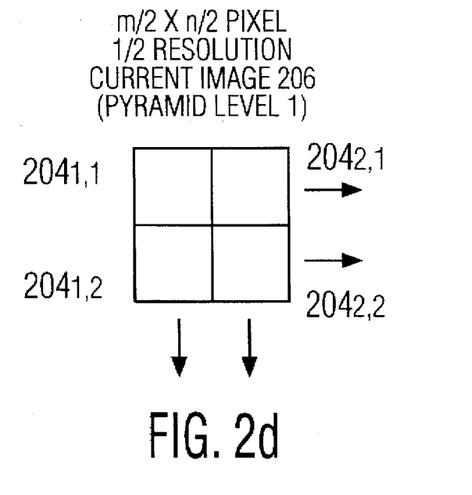
Figure 2E:
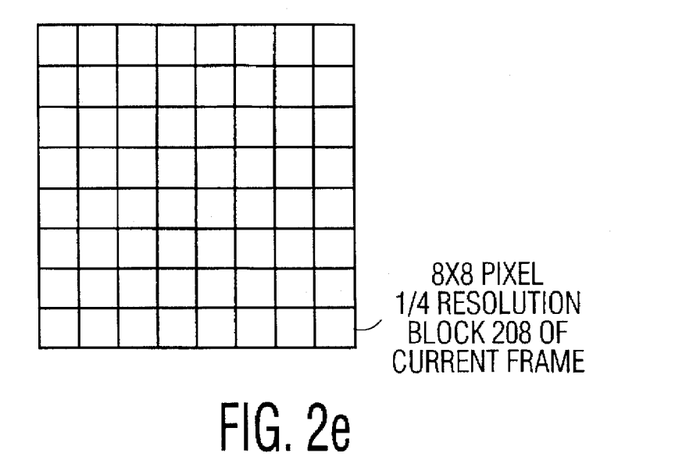
Figure 2F:
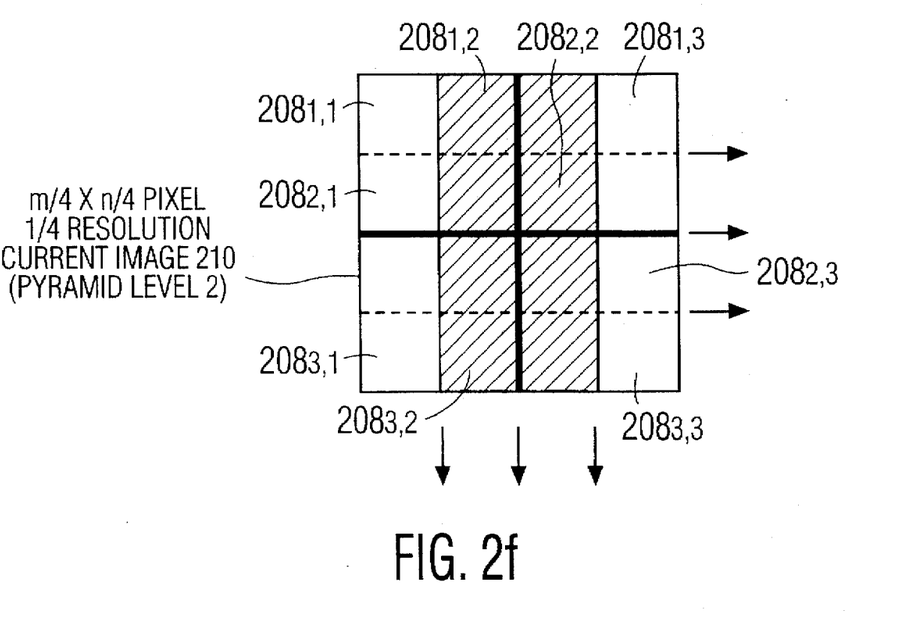
Figure 2G:
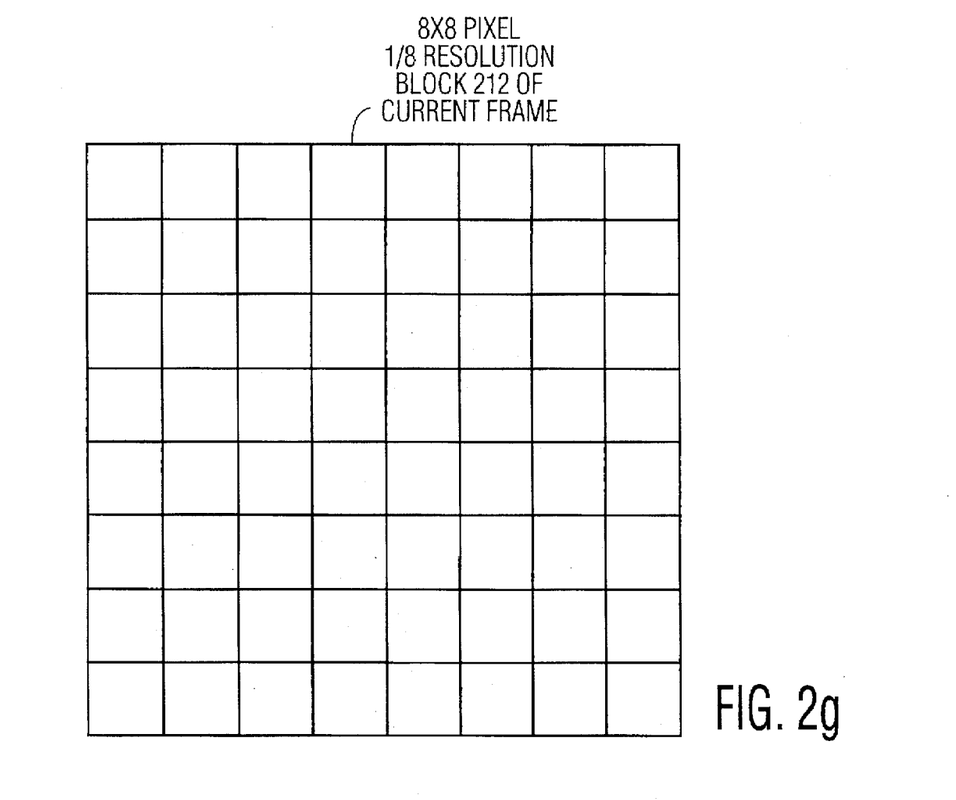
Figure 2H:
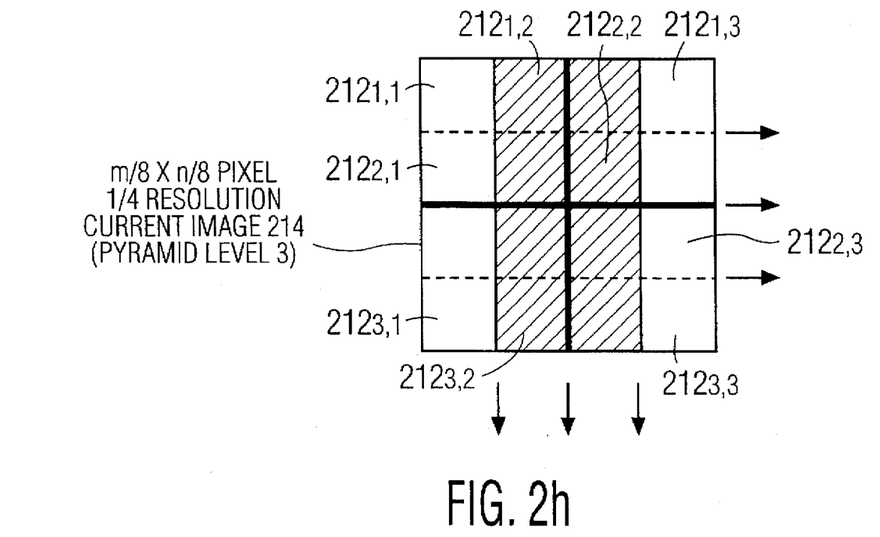

Referring now to FIGS. 2a to 2h there is shown the relationships that exist between the size of pixel blocks and the plurality of blocks into which the current m×n pixel full-resolution image frame is divided at each of respective pyramid levels 0, 1, 2 and 3 for use in a preferred embodiment of the motion-estimation method of the present invention. Specifically, for pyramid level 0, FIG. 2a shows 16×16 pixel full-resolution block 200 (which is substantially identical to above-described block 100 of FIG. 1), and FIG. 2b shows the contiguous arrangement of the plurality of 16×16 pixel full-resolution blocks $200_{1,1} \ldots 200_{m/16,n/16}$ making up the pyramid level 0 of current m×n pixel full-resolution image frame 202. For pyramid level 1, FIG. 2c shows 8×8 pixel ½-resolution (in each of its 2 dimensions) block 204, and FIG. 2d shows the contiguous arrangement of the plurality of 8×8 pixel ½-resolution blocks $204_{1,1} \ldots 204_{m/16,n/16}$ making up the pyramid level 1 of current m/2×n/2 pixel ½-resolution image frame 206. For pyramid level 2, FIG. 2e shows an 8×8 pixel ¼-resolution block 208, and FIG. 2f shows a 50% overlap (in each dimension) arrangement of the plurality of 8×8 pixel ¼-resolution blocks $208_{1,1} \ldots 208_{m/16,n/16}$ making up the pyramid level 2 of current m/4×n/4 pixel ¼-resolution image frame 210. For pyramid level 3, FIG. 2g shows 8×8 pixel ⅛-resolution block 212, and FIG. 2h shows the 50% overlap (in each dimension) arrangement of the plurality of 8×8 pixel ⅛-resolution blocks $212_{1,1} \ldots 212_{m/32,n/32}$ making up the pyramid level 3 of current m/32×n/32 pixel ⅛-resolution image frame 214. It is apparent that overlapping the image blocks by 50% in each dimension of pyramid levels 2 and 3 of the current image results in increasing the number of blocks by a factor of four with respect to a non-overlapped (i.e., contiguous) block arrangement.

The levels 2 and 3 overlap of 50% in both dimensions is simply exemplary. The overlap may be different in the two dimensions and the respective overlap in both dimensions may be more or less than 50%. The invention may be practiced by providing overlapping blocks in only one pyramid level or 2 or more pyramid levels.

In FIGS. 2a to 2h, each 8×8 pixel ½-resolution block 204 occupies the same size image area as 16×16 pixel full-resolution block 200; each 8×8 pixel ¼-resolution block 208 occupies 4 times the size image area as 16×16 pixel full-resolution block 200; and each 8×8 pixel ⅛-resolution block 212 occupies 16 times the size image area as 16×16 pixel full-resolution block 200. Thus, each pixel of block 212 occupies the same area as that occupied by 64 pixels of block 200; each pixel of block 208 occupies the same area as that occupied by 16 pixels of block 200; and each pixel of block 204 occupies the same area as that occupied by 4 pixels of block 200.

The preferred embodiment of the motion-estimation method of the present invention comprises the following four steps, details of which will be discussed below:

STEP 1

Use each of overlapped blocks $212_{1,1} \ldots 212_{m/32,n/32}$ of pyramid level 3 of current m/8×n/8 pixel ⅛-resolution image frame 214 as a search block to make an exhaustive match search of pyramid level 3 of the ⅛-resolution previous image over a given range area R with respect to the coordinates of that search block (i.e., search block is displaced by a single pyramid level 3 pixel distance in each dimension between successive matches) to determine the motion vector of that one of these matches by that pyramid level 3 search block that has the lowest match value.

STEP 2

Use each of overlapped blocks $208_{1,1} \ldots 208_{m/16,n/16}$ of pyramid level 2 of current m/4×n/4 pixel ¼-resolution image frame 210 as a search block to make P match searches of pyramid level 2 of the ¼-resolution previous image over, for example, a limited ±1, ±1 pixel range with each of these P match searches being made with respect to a separate "candidate" projected motion that corresponds to the motion vector of each respective one of the P pyramid level 3 overlapping blocks onto which a predetermined portion (e.g., the center) of the pyramid level 2 search block is projected, to determine the motion vector of that one of these matches by that pyramid level 2 search block that has the lowest match value.

STEP 3

Use each of contiguous blocks $204_{1,1} \ldots 204_{m/16,n/16}$ of pyramid level 1 of current m/2×n/2 pixel ½-resolution image frame 206 as a search block to make Q match searches of pyramid level 1 of the ½-resolution previous image over a ±1, ±1 pixel range with each of these Q match searches being made with respect to a separate "candidate" projected motion that corresponds to the motion vector of each respective one of the Q pyramid level 2 overlapping blocks onto which a predetermined area of the level 1 search block is projected, to determine the motion vector of that one of these matches by that pyramid level 1 search block that has the lowest match value.

STEP 4

Use each of contiguous blocks $204_{1,1} \ldots 204_{m/16,n/16}$ of pyramid level 0 of current m×n pixel full-resolution image frame 206 as a search block to make a single match search of pyramid level 0 of the full-resolution previous image over a ±1, ±1 pixel range with respect to that block of pyramid level 1 of the previous image found during the match search of pyramid level 1 to have the lowest match value, to determine the motion vector of that one of these matches by that pyramid level 0 search block that has the lowest match value.

The use of large area search blocks in the higher pyramid levels is desirable in reducing the chance of matching a low-resolution block at a displacement that doesn't correspond to the correct motion but just happens to have a low residual and in promoting smoothness of the motion field obtained in pyramid level 0.

On the other hand, a problem is that large blocks are more likely to straddle boundaries between differently moving regions, giving poor matches, especially if the block is split into two roughly equal pieces. The overlap used in STEPS 1 and 2 makes it possible to minimize this problem. This is true because it is likely that in searching a group of blocks around a boundary between two large objects in the image scene, at least some of the blocks of the group will not split into two equal pieces.

STEP 1 performs block match searches over a $\pm R_x/8$, $\pm R_y/8$ pixel displacement to cover the search range equivalent to the full resolution range $\pm R_x, \pm R_y$. Thus, each block match search requires R/64 match computation operations. The ratio of the area of a full-resolution pyramid level 0 pixel to the area of each pyramid level 3 pixel is 1/64.

However, due to the horizontal and vertical overlap in STEP 1, the ratio is increased by a factor of 4 (for 50% overlap) to 1/16. Thus, the "computational complexity" (as defined above) of STEP 1 is R/64×1/16=R/1024. Based on the above assumption that each of $\pm R_x$ and $\pm R_x$ is ±128 full-resolution pixels (so that the range area R is 65,536 full-resolution pixels) the "computational complexity" of STEP 1 is only 65,536/1024=64.

Figure 3A:
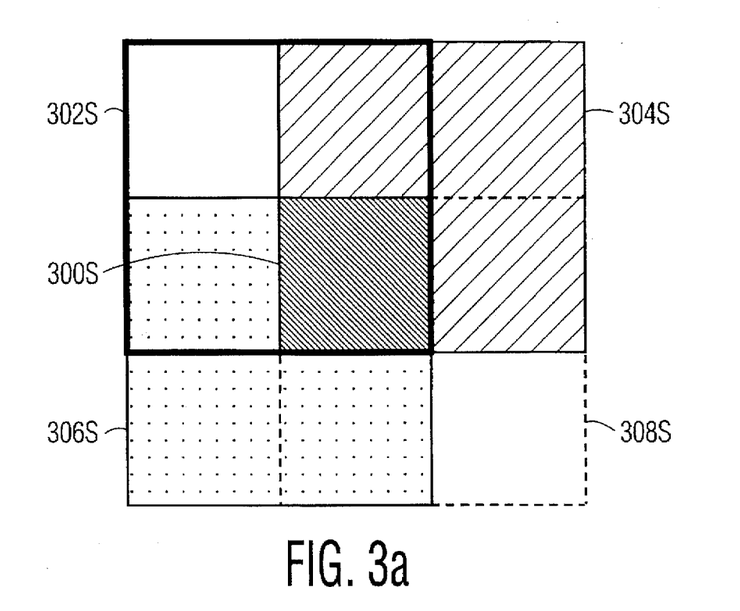
FIGS. 3a, 3b, 3d and 4 are helpful in explaining the the motion-estimation method steps of the preferred embodiment of the present invention.
Figure 3B:
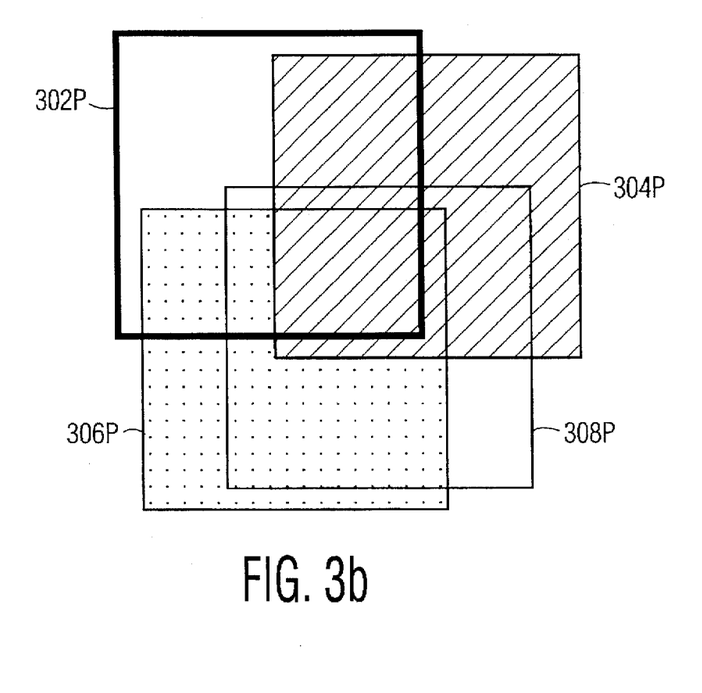
Figure 3C:
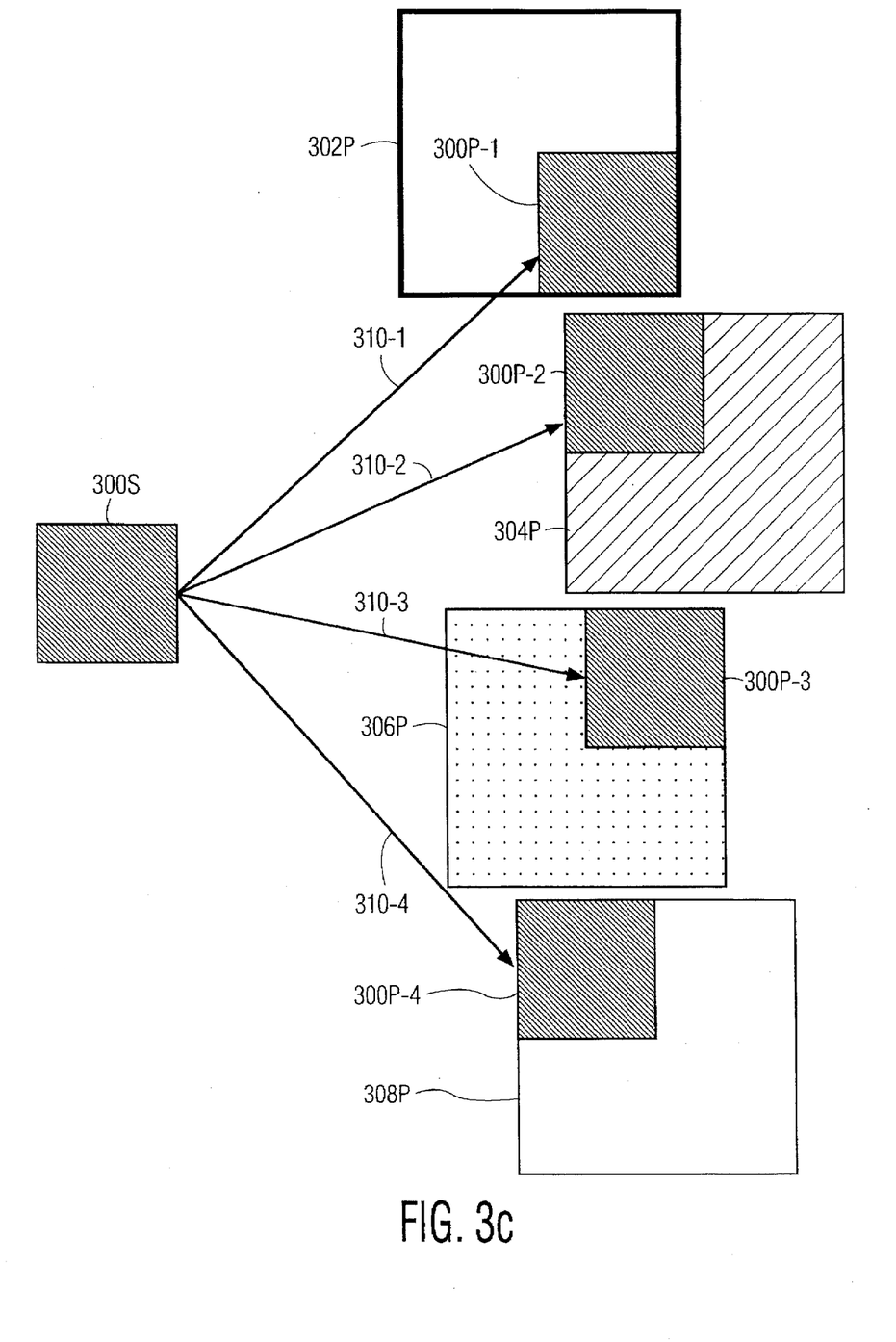
Figure 4:
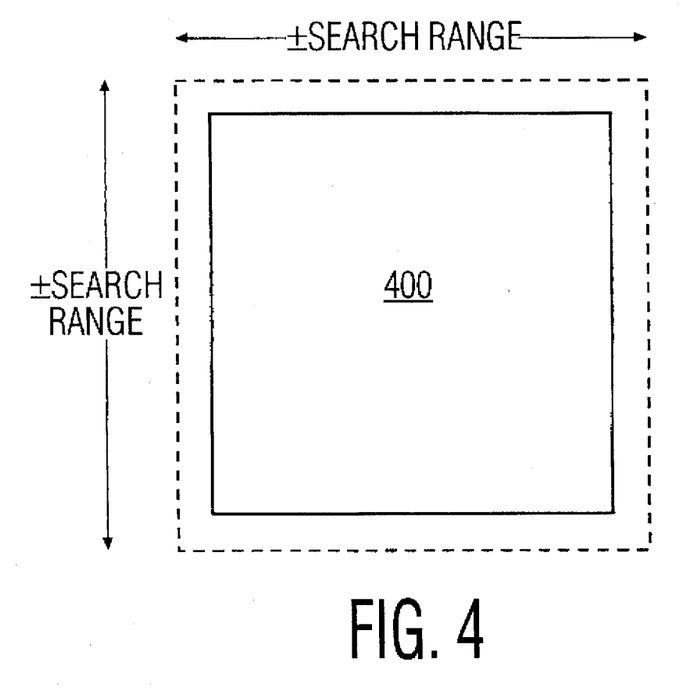

FIGS. 3a, 3b and 3c are helpful in explaining STEP 2 in more detail. FIG. 3a shows the relationship of a pyramid level 2 search block 300S to each of its corresponding group of four 50% horizontal and 50% vertical overlapped pyramid level 3 search blocks 302S, 304S, 306S and 308S of the current frame image. In FIG. 3b, block 302P is that block of the previous fame image found to have the lowest match value with respect to search block 302S, during the pyramid level 3 search. Similarly, blocks 304P, 306P and 308P, respectively, are blocks of the previous fame image found to have the lowest match value with respect to corresponding ones of search blocks 304S, 306S and 308S during the pyramid level 3 search. Blocks 302P, 304P, 306P and 308P of FIG. 3b are diagrammatically shown spatially disassociated from one another in FIG. 3c in order to clearly show each of the pyramid level 2 blocks 300P-1, 300P-2, 300P-3 and 300P-4 of the previous fame image that corresponds to search block 300S of the current fame image shown in FIG. 3a.

As further diagrammatically shown in FIG. 3c, pyramid level 2 block 300P-1 has a "candidate" motion vector 310-1 with respect to search block 300S associated therewith (which "candidate" motion vector 310-1 corresponds to the image displacement between pyramid level 3 search block 302S of the current frame image shown in FIG. 3a and the pyramid level 3 block 302P of the previous frame image shown in FIG. 3b that has been found during the STEP 1 search by search block 302S to have the lowest match value). "Candidate" motion vectors 310-2, 310-3 or 310-4 are respectively associated with their pyramid level 2 blocks 300P-2, 300P-3 and 300P-4 in a similar manner.

FIGS. 3a, 3b and 3c applies to the determination of the "candidate" motion vectors of STEP 3 in the same manner as described above with respect to STEP 2.

Each of STEPS 2, 3 and 4 involves making block-match searches over a limited search range of for example a ±1, ±1 pixel displacement (See FIG. 4) with respect to block 400 of the previous frame at the resolution of that step. Thus, a ±1, ±1 block-match search requires 9 match computation operations with a search block of that resolution being used to match block 400 itself and each of the 8 displaced other blocks within the FIG. 4 search range.

Therefore, due to STEP 1 employing horizontal and vertical overlap, STEP 2 requires 36 (i.e., 9×4) match computation operations of block 208 (for 50% overlap) to cover its entire search range for each of its four "candidate" motion vectors. The ratio of the area of a full-resolution pixel to the area of each pyramid level 2 pixel is 1/16. However, due to both horizontal and vertical 50% overlap employed in STEP 2, the ratio is increased by a factor of 4 to 1/4. Therefore, the additional "computational complexity" (as defined above) of STEP 2 itself is 1/4×36=9.

If STEP 2 also employs 50% horizontal and 50% vertical overlap, STEP 3 requires 36 (i.e., 9×4) match computation operations of block 204 to cover its entire search range. The ratio of the area of a full-resolution pixel to the area of each pyramid level 1 pixel is 1/4 times. Since there is no overlap in STEP 3, there is no increase in this ratio. Therefore, the additional "computational complexity" (as defined above) of STEP 3 itself is 1/4×36=9.

STEP 3 does not employ overlap, thus STEP 4 requires only 9 match computation operations of block 200 to cover its entire search range. The ratio of the area of a full-resolution pixel to the area of each pyramid level 1 pixel is 1. Since there is no overlap in STEP 4, there is no increase in this ratio. Therefore, the additional "computational complexity" (as defined above) of STEP 4 itself is also 9.

The total "computational complexity" of all of STEPS 1 to 4 of the above-described preferred embodiment of the block-matching motion estimation method of the present invention is 64+9+9+9=91, while the "computational complexity" of the conventional block-matching motion estimation method exemplified by FIG. 1 is 65,536. Thus, the above-described preferred embodiment of the block-matching motion estimation method of the present invention provides a reduction in "computational complexity" of slightly more than 720 (i.e., 65,536/91) with respect to the conventional block-matching motion estimation method exemplified by FIG. 1.

Further, the precision of the value of the motion vector associated with that single block found to have the lowest match value by STEP 4 of the preferred embodiment of the block-matching motion estimation method of the present invention may be increased in the same manner as described above in connection with the conventional block-matching motion estimation method exemplified by FIG. 1.

It is not intended that the present invention be limited to the particular parameters of the preferred embodiment of a block-matching image-motion estimation method described above, but that it extends to any block-matching image-motion estimation method that employs the principles of the present invention to reduce "computational complexity".

What is claimed is:

1. A video signal motion compensated coding process including a block-matching image motion estimation process for generating motion vectors representing image motion, said process comprising the steps of:

a) providing full-resolution 2-dimensional digitized video signals representing a current image frame;

b) delaying said full-resolution 2-dimensional digitized video signal to provide full-resolution 2-dimensional digitized video signals representing a previous image frame;

c) generating from said video signal representing a current image frame, N video signals each representing an image with successively lower-resolution, and generating from said video signal representing a previous image frame, N video signals each representing an image with successively lower-resolution, where N is a positive integer, and each of said full-resolution current and previous image frames constitutes a zero (0) resolution level;

d) dividing video signal representing an Mth resolution level of said current image frame into a plurality of overlapping search blocks of a first size wherein said blocks are overlapped in at least one of said 2 dimensions, where the 0th resolution level is less than the $M^{th}$ resolution level is less than or equal to the $N^{th}$ resolution level; and e) performing a block matching search for each of said overlapped search blocks of said current image frame over a given range area of the Mth resolution level of said previous image frame to determine a motion vector to that block of said Mth resolution level of said previous image frame which exhibits a closest match value with respect to that search block;

f) using a plurality of motion vectors generated for blocks in the Mth resolution level in determining respective motion vectors for respective blocks in an (M−1)th resolution level; and g) generating motion vectors for image blocks in successively lower resolution levels using motion vectors generated in the immediately higher resolution level, including motion vectors generated for respective blocks of the 0th resolution level as a component of a coded video signal, and transmitting said coded video signal.

2. The method defined in claim 1, comprising the further steps of:

h) dividing the (M−1)th resolution level of said current image frame into a plurality of second search blocks no larger than said first size; and i) determining blocks X of said Mth resolution level which are collocated at least in part with respective second search blocks of said (M−1)th resolution level;

j) for each of said blocks X of said Mth resolution level, utilizing motion vectors of the blocks X to determine X search areas of limited search range in resolution level (M−1);

k) performing a block matching search for each of said search areas in resolution level (M−1) and selecting a motion vector arising from the block matching search producing a lowest error value for said second search block.

3. The method defined in claim 2, wherein:

said plurality of search blocks of said first size are substantially 50% overlapped in both of said 2 dimensions.

4. The method defined in claim 2, wherein:

the value of N is 3;

whereby the Mth resolution level is the 3rd resolution level and the (M−1)th resolution level is the 2nd resolution level.

5. The method defined in claim 4, wherein:

step (h) comprises dividing the 2nd resolution level of said current image frame into a plurality of said second search blocks which are overlapped in at least one of said 2 dimensions.

6. The method defined in claim 5, wherein:

both said plurality of search blocks of said first size and said plurality of said second search blocks are substantially 50% overlapped in both of said 2 dimensions.

7. The method defined in claim 6, wherein said search blocks of said first size are rectangular in shape, and wherein:

step (h) comprises dividing the 2nd resolution level of said current image frame into a plurality of rectangular second search blocks each of which has respective dimensions substantially one-half in size of the corresponding dimensions of a search block of said first size.

8. The method defined in claim 5, comprising the further steps of:

l) dividing the 1st resolution level of said current image frame into a plurality of third search blocks which are no larger in size than said second search blocks, with each of said third search blocks being projected on said overlapped second search blocks of said current image frame; and m) employing a given one of said third search blocks for use in making a separate match search over a ±1, ±1 range of each block of said 2nd resolution level onto which said given one of said third search block projects, wherein each separate match search employs the motion vector associated with a different one of those blocks of said 2nd resolution level to determine a refined motion vector for that single block of said ±1, ±1 ranges of all of said separate match searches which exhibits the lowest match value of the total number of matches made with respect to that one of said third search blocks.

9. The method defined in claim 8, wherein step l) comprises dividing the 1st resolution level of said current image frame into a plurality of third search blocks which are non-overlapping.

10. The method defined in claim 8, wherein said plurality of search blocks of said first size and said plurality of said second search blocks are both rectangular in shape, and wherein:

step (h) comprises dividing the 2nd resolution level of said current image frame into a plurality of rectangular second search blocks each of which has respective dimensions substantially one-half in size of the corresponding dimensions of a search block of said first size; and step (l) comprises dividing the 1st resolution level of said current image frame into a plurality of rectangular third search blocks each of which has respective dimensions substantially one-half in size of the corresponding dimensions of a second search block.

11. The method defined in claim 8 comprising the further steps of:

n) dividing the 0th resolution level of said current image frame into a plurality of fourth search blocks which are no larger in size than said third search blocks; and o) employing a given one of said fourth search blocks for use in making a match search over a ±1, ±1 range of each block of said 0th resolution level of said previous image frame to determine a refined motion vector for that single block of said ±1, ±1 range which exhibits the closest match value made with respect to that one of said fourth search blocks.

12. The method defined in claim 11, comprising the further step of:

p) employing each of said fourth search blocks as said given one of said fourth search blocks.

13. The method defined in claim 11, wherein said plurality of search blocks of said first size, said plurality of said second search blocks and said third search blocks are all rectangular in shape, and wherein:

step (h) comprises dividing the 2nd resolution level of said current image frame into a plurality of rectangular second search blocks each of which has respective dimensions substantially one-half in size of the corresponding dimensions of a search block of said first size;

step (l) comprises dividing the 1st resolution level of said current image frame into a plurality of rectangular third search blocks each of which has respective dimensions substantially one-half in size of the corresponding dimensions of a second search block; and step (n) comprises the step of dividing the 0th resolution level of said current image frame into a plurality of rectangular fourth search blocks each of which has respective dimensions substantially equal in size of the corresponding dimensions of a third search block.

14. The method defined in claim 13, wherein:
the resolutions of said 3rd, 2nd, and 1st resolution levels are, respectively, ⅛, ¼ and ½ of the full-resolution 0th resolution level in each of the 2 dimensions thereof.

15. The method defined in claim 13, wherein:
each of said 3rd, 2nd and 1st resolution level search blocks comprises a block of R×R pixels of that resolution level, and said 0th resolution level search block comprises a block of 2R×2R pixels of said 0th resolution level where R is an integer.

16. The method defined in claim 1, wherein:
deriving said N resolution levels of successively lower-resolution images of said current image frame and said N resolution levels of successively lower-resolution images of said previous image frame by Gaussian pyramid processing employing a filter comprising kernel coefficients 1,4,6,4,1 at each of said N levels thereof.

17. A block-matching method for generating motion vectors by performing block-matching on successively higher resolution images by refining motion vectors determined for corresponding image areas in lower resolution images comprising:

providing a video signal representing a current image frame;

delaying the video signal to provide delayed video signal representing a current image frame;

filtering the video signal and delayed video signal to provide a plurality of video signals of successively lower image resolution and delayed video signals of successively lower image resolution;

dividing a lower image resolution video signal into blocks of pixels and generating motion vectors for each block of pixels by block matching using video and delayed video signals of like image resolution;

dividing each video signal of higher image resolution into blocks of pixels;

defining a search area of limited search range for respective blocks of a higher image resolution video signal using motion vectors determined for blocks included in corresponding image areas in the immediately lower image resolution video signal;

performing block matching in respective said search areas of limited search range, for respective blocks of pixels in respective image resolution video signals;

for at least one image resolution video signal, but not the highest image resolution video signal, dividing the video signal into overlapping blocks of pixels to provide a plurality of search areas of limited search range for performing block matching for each block of pixels in the immediately next higher resolution image; and including motion vectors generated for respective blocks of the highest image resolution video signal as a component of a coded video signal, and transmitting said coded video signal.

18. The method set forth in claim 17 wherein the step of performing block matching in respective said search areas of limited search range, for respective blocks of pixels in an immediately higher resolution video signal than said at least one level of resolution video signal, comprises;

dividing said immediately higher resolution video signal R, into blocks $BB_i$;

determining ones of respective overlapping blocks, $B_i$'s, in said immediately lower resolution video signal, R−1, collocated at least in part with respective blocks $BB_i$ in said immediately higher resolution video signal, R, and selecting motion vectors $MV_{Bi}$'s associated with the blocks $B_i$'s that have been determined;

performing block matching for block $BB_i$ in the immediately higher resolution video signal R, in respective search areas designated respectively by each of the motion vectors $MV_{Bi}$'s, and selecting as motion vector for block $BB_i$, the motion vector corresponding to the one of the block matches providing the best match.

* * * * *